Patented Mar. 20, 1923.

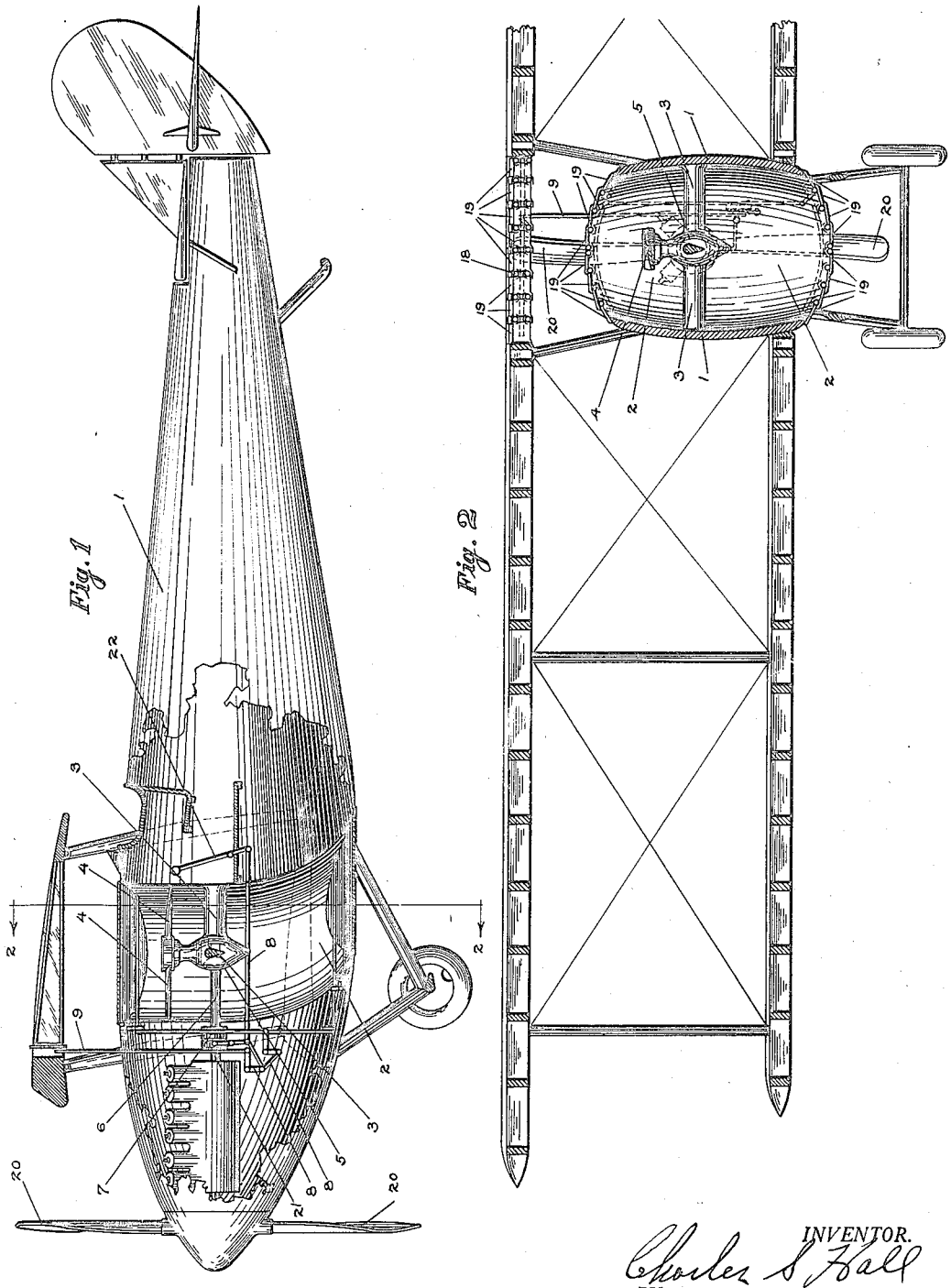

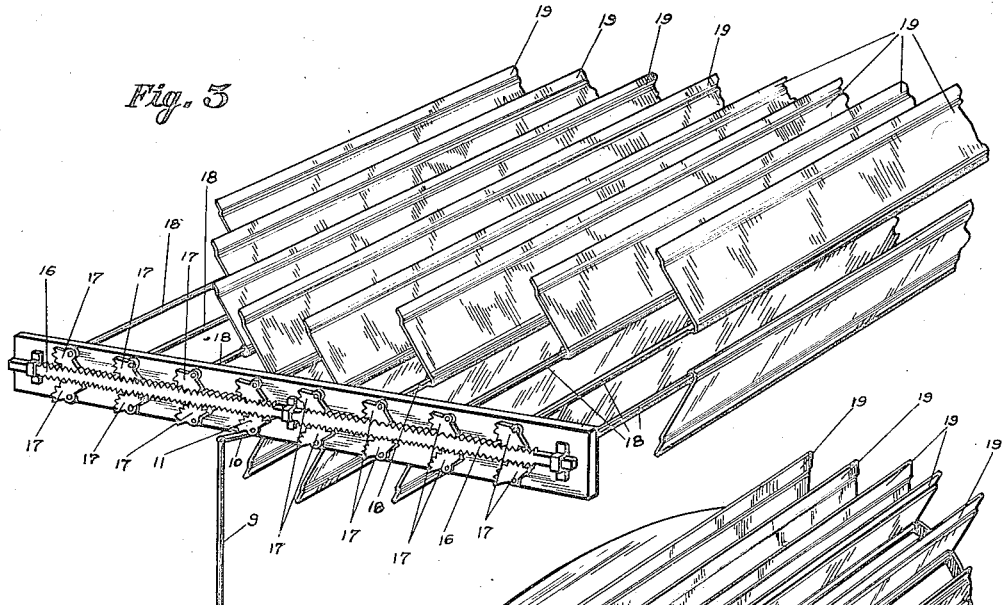
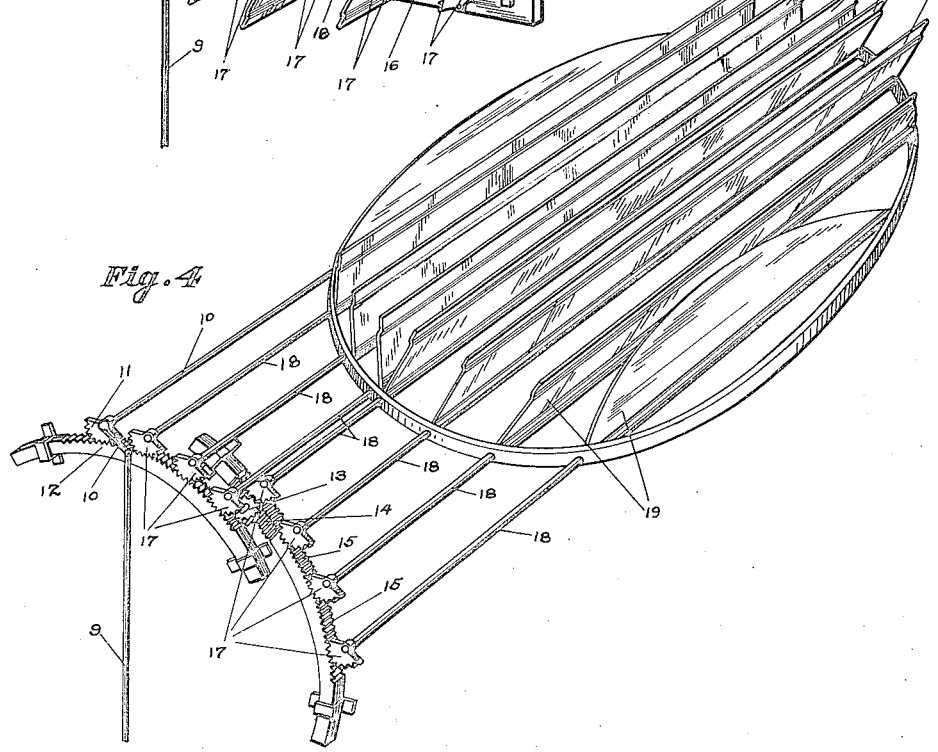

1,449,099

UNITED STATES PATENT OFFICE.

CHARLES S. HALL, OF LOS ANGELES, CALIFORNIA.

AIRCRAFT.

Application filed April 27, 1921. Serial No. 464,793.

*To all whom it may concern:*

Be it known that I, CHARLES S. HALL, a citizen of the United States, residing in Los Angeles, county of Los Angeles, State of California, have invented certain new and useful Improvements in Aircraft, and do hereby declare the following a full, clear, and exact description of the invention, such as will enable others skilled in the art to which it appertains to make and use the same, reference being had to the accompanying drawings, and to the characters of reference marked thereon, which form a part of this specification.

This invention relates, generally, to improvements in aircraft by the adaption of a vertical lifting propeller within a tube constructed within the body or fuselage of the aircraft and a means of operating the said propeller whereby the weight of the aircraft may be transferred to the air, by the operation of said vertical propeller, by the downward velocity with which the air is impelled through the said tube, thus enabling the aircraft to take the air with little or no ground speed.

A further object being to facilitate a relatively slow and safe landing by the operation of the lifting propeller aforesaid, whereby the weight of the machine may be transferred to the air, thus checking and controlling both the angular velocity of the machine downwardly and the ground speed while making a landing.

Another object is to provide a horizontally stream-lined fuselage with a lifting propeller horizontally and rotatably mounted and coaxialed within a tube having its longitudinal axis relatively coinciding with the center of gravity of the aircraft, the said tube having the lower end thereof gradually curved backwardly whereby the air-stream induced by the operation of the propeller downwardly through the said tube and backwardly and outwardly will have both an elevating and propelling effect upon the aircraft thus affording a means of taking-off and landing at a small ground velocity.

A further object being to provide a means of fully developing the engine power for the purpose of facilitating the landing of an aircraft by means of a vertical lifting propeller placed within the fuselage.

The present invention is an improvement over those described in patent numbered 1,307,826, dated June 24, 1919, and patent application Serial Number 376,846, filed April 26, 1920.

Other objects of this invention, not at this time more particularly enumerated, will be clearly understood from the following detailed description of this invention and clearly illustrated in the accompanying drawings, in which:—

Figure 1. is a side view of the aircraft with parts of wings removed and part of the body shell broken away so as to show the control as well as the construction of the vertically inclined tube with the lifting propeller placed therein.

Figure 2. is a cross section of view taken from an angle of ninety degrees from that shown in Figure 1 and from the rear of the aircraft and on line 2—2, as shown in Figure 1, showing placement of the lifting propeller and shutter attachments in place.

Figure 3. is a perspective view of the shutter mechanism detached from the aircraft, showing the details of construction.

Figure 4. is a perspective view of the shutter attachment detached from the fuselage, showing the details of construction. This construction may be used in closing the top of the tube, as well as closing the bottom of the tube.

In carrying out my invention, a fuselage, 1, as shown in Figures 1 and 2, is constructed and in which there is constructed a tube, 2, as shown in said Figures 1 and 2. Within this tube 2 is fixed a spider 3 upon which is mounted a vertically lifting propeller 4, as shown in Figures 1 and 2. Said lifting propeller is rotatably mounted upon a vertical shaft extending from gear case 5, as shown in Figures 1 and 2, which gear case is fitted in operative relation with a gear secured to shaft 6. Shaft 6 is connected by a clutch 7 by any suitable operative means to control mechanism 8, all shown in Figure 1.

To control mechanism 8 is attached shutter control rods 9, as shown in Figures 3 and 4, these control rods 9 are connected by suitable fastenings to rocker arm 10 to which is rigidly attached gear segment 11 held in operative relation with cogway 12. Cogway 12, as shown in Figure 4, is held in operative relation with cogwheel 13, which cogwheel is held in mesh with a corresponding cogway 14 on cogway 15, as shown in Figure 4. Control rod 9, as shown in Figures 1, 2 and 3, is connected rigidly with rocker arm 10 in operative relation through gear segment 11 with cogway 16, as shown in Figure 3. Gear segments 17 are fixed to rods 18 to which shutters 19 are rigidly attached. Rods 18 and gear segments are held in operative relation upon cogways 17, as shown in Figures 3 and 4, by any suitable framework, which framework is attached by any suitable means to the plane, or to the fuselage, as the case may be. Shutters shown in Figure 4 may be attached to the fuselage either to cover the top opening of the tube constructed within the fuselage or the bottom opening of same tube, as shown in cross section in Figure 2.

Thrust propeller 20 is shown in Figures 1 and 2 held in operative position upon the fuselage and upon the engine shaft 21, as shown in Figure 1, to which any suitable clutch device 7 is attached and controlled by mechanism 8 through the lever 22, as shown in Figure 1.

Various details, such as supports and suitable fastenings are not herein shown as I do not make any claim to such means of support or fastenings.

Having in the foregoing description given general details of arrangement and combination of parts comprising the essential principles of this invention, I will now briefly describe its operation.

After starting the engine which turns shaft 21, as shown in Figure 1, the pilot, by the manipulation of lever 22, moves mechanism 8 which causes clutch 7 to engage on shaft 6, which causes the said shaft to rotate; which rotation is communicated to the vertical lifting propeller 4 through the vertical shaft to which it is attached and held in operative relation by gear case 5. Contemporaneously with the engagement of clutch upon shaft 6, the manipulation of lever 22, causes relative movements of rods 9, as shown in Figures 3 and 4, which actuates rocker arms 10, causing the same to swing shutters 19, whereby the said shutters are placed in a vertical position so as to permit the air to pass downwardly through the same. Relative movement is actuated through gear segment 17 to cogways 15 and 16, as the case may be, which causes all of the said shutters to take a vertical position in operative relation, as shown in Figures 3 and 4, thus the downward current of air established by the rotation of the vertical propeller in tube 2, as shown in Figures 1 and 2, creates such a displacement of the air by the rotation of vertical propeller 4 by engine power, whereby this displacement may be devoted towards the vertical lifting of the aircraft from the ground. In this way the aircraft may be enabled to take the air with reduced ground speed, or no ground speed at all, according to the speed size and lifting power of the vertical propeller.

When sufficient altitude is attained, the pilot, by manipulation of lever 22, stops the vertical lifting propeller 4 and also closes all of the shutters 19 through the disengagement of clutch 7, thus diverting the engine power to the rotation of thrust propeller 20 for horizontal flying.

In making landing, the pilot may repeat the manipulations above described, whereby the downward rush of the air through tube 2, actuated by vertical lifting propeller 4, will enable him to land the aircraft at a reduced ground speed.

I am aware that various changes in arrangements and details can be made without departing from the spirit of this invention and I do not wish to be understood as limiting myself to the design shown in the accompanying drawings, as several engines may be employed for the operation of either, or both of the propellers. Nor do I wish to be confined to any particular shape of the vertically inclined tube construction through the fuselage, nor to any particular size, shape or pitch of the vertical lifting propeller used within said tube, nor do I wish to be understood as limiting myself to the exact placement of said tube within any particular part or portion of the fuselage.

I claim:

1. In an aircraft having a horizontally streamlined fuselage, the combination of a horizontally mounted propeller centrally arranged within a tube having a vertical longitudinal axis and having the lower end thereof backwardly disposed with respect to the normal line of flight of the aircraft, and a means of opening and closing the ends of the said tube by pivotally arranged shutters.

2. In an aircraft having a horizontally streamlined fuselage, a tube centrally located and integrally constructed in the said fuselage, the said tube having a curvature in its longitudinal axis downwardly and backwardly, a horizontally mounted propeller operatively arranged within the said tube, and operatively arranged shutters mounted at each end of the said tube so as to open and close the ends thereof.

3. In an aircraft having a horizontally streamlined fuselage, having a tube constructed within the fuselage thereof with a horizontally mounted and operatively arranged propeller coaxialed within the said tube so as to induce a downward flow of air through the said tube, the said flow being on lines parallel with the longitudinal axis thereof, the said longitudinal axis being curvilinear and disposed downwardly and backwardly with respect to the normal line of flight and transversely thereto, and a means of opening and closing the ends of the said tube.

In testimony whereof I have signed my name to this specification.

CHARLES S. HALL.